US011770358B2

(12) United States Patent
Inayethulla (10) Patent No.: US 11,770,358 B2
(45) Date of Patent: Sep. 26, 2023

(54) SECURITY FOR VIRTUAL EXTENSIBLE LOCAL AREA NETWORKS

(71) Applicant: DELL PRODUCTS L.P., Round Rock, TX (US)

(72) Inventor: Syed Inayethulla, Karnataka (IN)

(73) Assignee: DELL PRODUCTS L.P., Round Rock, TX (US)

( * ) Notice: Subject to any disclaimer, the term of this patent is extended or adjusted under 35 U.S.C. 154(b) by 181 days.

(21) Appl. No.: 16/815,637

(22) Filed: Mar. 11, 2020

(65) Prior Publication Data

US 2021/0288935 A1 Sep. 16, 2021

(51) Int. Cl.
| | |
|---|---|
| *H04L 29/12* | (2006.01) |
| *H04L 61/103* | (2022.01) |
| *H04L 9/40* | (2022.01) |
| *H04L 12/46* | (2006.01) |
| *H04L 9/08* | (2006.01) |
| *H04L 101/622* | (2022.01) |

(52) U.S. Cl.
CPC .......... *H04L 61/103* (2013.01); *H04L 9/0838* (2013.01); *H04L 12/4641* (2013.01); *H04L 63/0876* (2013.01); *H04L 2101/622* (2022.05)

(58) Field of Classification Search
CPC .................. H04L 61/103; H04L 9/0838; H04L 12/4641; H04L 61/6022; H04L 63/0876; H04L 9/0866
See application file for complete search history.

(56) References Cited

U.S. PATENT DOCUMENTS

| | | | | |
|---|---|---|---|---|
| 10,057,223 B2 * | 8/2018 | Wiseman | ............ | H04L 63/0853 |
| 10,873,587 B2 * | 12/2020 | Kuperman | .......... | H04L 63/0807 |
| 11,070,975 B2 * | 7/2021 | Larignon | ............ | H04W 12/033 |
| 2003/0021418 A1 * | 1/2003 | Arakawa | ............... | H04L 9/0891 |
| | | | | 380/277 |
| 2004/0054926 A1 * | 3/2004 | Ocepek | ............. | H04L 29/12009 |
| | | | | 726/28 |
| 2004/0139028 A1 * | 7/2004 | Fishman | .............. | G06Q 20/341 |
| | | | | 705/67 |
| 2016/0381015 A1 * | 12/2016 | Ravinutala | .......... | H04L 63/0272 |
| | | | | 726/7 |
| 2017/0033924 A1 * | 2/2017 | Jain | ......................... | H04L 63/06 |
| 2019/0036736 A1 * | 1/2019 | Gao | .................... | H04L 61/6022 |

\* cited by examiner

*Primary Examiner* — Gil H. Lee
*Assistant Examiner* — Juan C Turriate Gastulo
(74) *Attorney, Agent, or Firm* — NORTH WEBER & BAUGH LLP (57) ABSTRACT

Presented herein are embodiments of mechanisms to add security in the communication of messages between devices, particularly in the context of VXLAN (Virtual eXtensible Local Area Network (LAN)) environments. When a VXLAN device sends a multicast message to discover other devices in the network, there is possibilities for rogue devices to respond and then receive data that is not intended for them. In one or more embodiments, information handling systems operating as a VTEP (VXLAN tunnel endpoint) may use enhanced encryption that is shared with other authorized VTEP—but not shared with rough VTEP devices—to verify other authorized VTEPs. In one or more embodiments, information used to verify a VTEP device is included in the message, such as included in the header, which a properly configured receiving VTEP will recognize and use to verify that that sending VTEP is not a rogue device.

21 Claims, 10 Drawing Sheets

Add verified MAC address of remote device to the APR table

SECURITY FOR VIRTUAL EXTENSIBLE LOCAL AREA NETWORKS

BACKGROUND

The present disclosure relates generally to information handling system. More particularly, the present disclosure relates to secure VXLANs (Virtual eXtensible Local Area Networks (LANs)).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A VXLAN (Virtual eXtensible Local Area Network (LAN)) is typically used to extend Layer 2 (L2) server connectivity over an underlying Layer 3 (L3) transport network in a virtualized data center. A virtualized data center generally comprises virtual machines (VMs) in a multi-tenant environment. The VXLAN-shared forwarding domain allows hosts such as virtual and physical machines, in tenant L2 segments to communicate over the shared IP network. A tenant segment can be a group of hosts or servers that are spread across an underlay network. A VxLAN typically has a VTEP (VXLAN tunnel endpoint). A VTEP is a switch with connected end hosts that are assigned to virtual networks. The virtual networks map to VXLAN segments. Local and remote VTEPs typically perform encapsulation and de-capsulation of VXLAN headers for the traffic between end hosts. A VTEP may also be known as a network virtualization edge (NVE) node.

Figure 1:
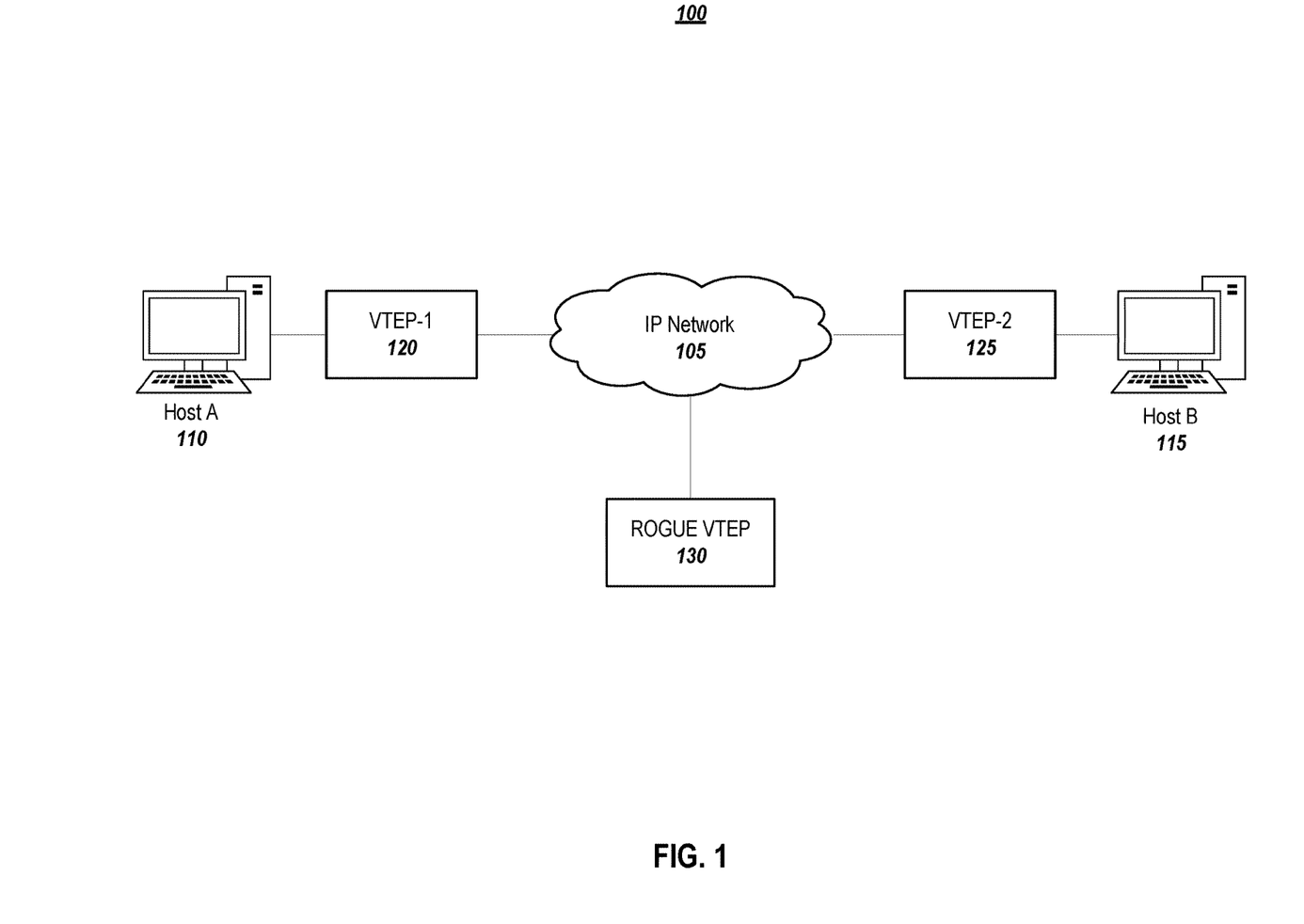
FIG. 1 ("FIG. 1") depicts a VXLAN environment that includes a rogue VTEP device, according to embodiments of the present disclosure.

One problem is that VXLAN does not provide security when its data plane is learning address information using multicast. As shown in FIG. 1, when a host (e.g., Host A 110) wants to send traffic to another host (e.g., Host B 115) via a default gateway (e.g., VTEP-1 120), the VTEP attempts to find the MAC (Media Access Control) address of the remote VTEP (e.g., VTEP-2 125) through multicast flooding. Note that each VNI (VXLAN network identifier (VNI), which is typically a 24-bit ID number that identifies a tenant segment and transmits in a VXLAN-encapsulated packet, is assigned to a particular multicast group. For the example, assume that VTEP-2 125 joins the multicast group. VTEP-1 120 sends a multicast packet encoded VXLAN header, which encodes an Address Resolution Protocol (ARP) packet. VTEP-2 125 receives the multicast packet and replies to it. Upon receiving the reply from VTEP-2, VTEP-1 updates its ARP/MAC table. One problem is that if any rogue VTEP (e.g., Rogue VTEP 130) joins the multicast group and replies to the ARP request, it can trick the sender (e.g., VTEP-1 120) and future traffic will be directed to the rogue VTEP.

Accordingly, it is highly desirable to find new, more efficient ways to provide improved security in VXLAN environments.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF THE PREFERRED EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of VXLANs and ARP messages, aspects of the present disclosure are not so limited. Accordingly, the aspects of the present disclosure may be applied or adapted for use in other contexts and using other messages.

Shared encryption information may be used to help improve security in when remote network devices communicate, such as VTEP devices in VXLAN environments. Each VTEP information handling system (or device) may be configured with one or more security elements to help verify a valid VTEP device from a rough VTEP device. In one or more embodiments, a VTEP device may be configured (e.g., via Command Line Interface (CLI) or other interface) with secret-key, a secret-text, and a type of encryption, which will be used to generate one or more unique encryption codes.

Figure 2:
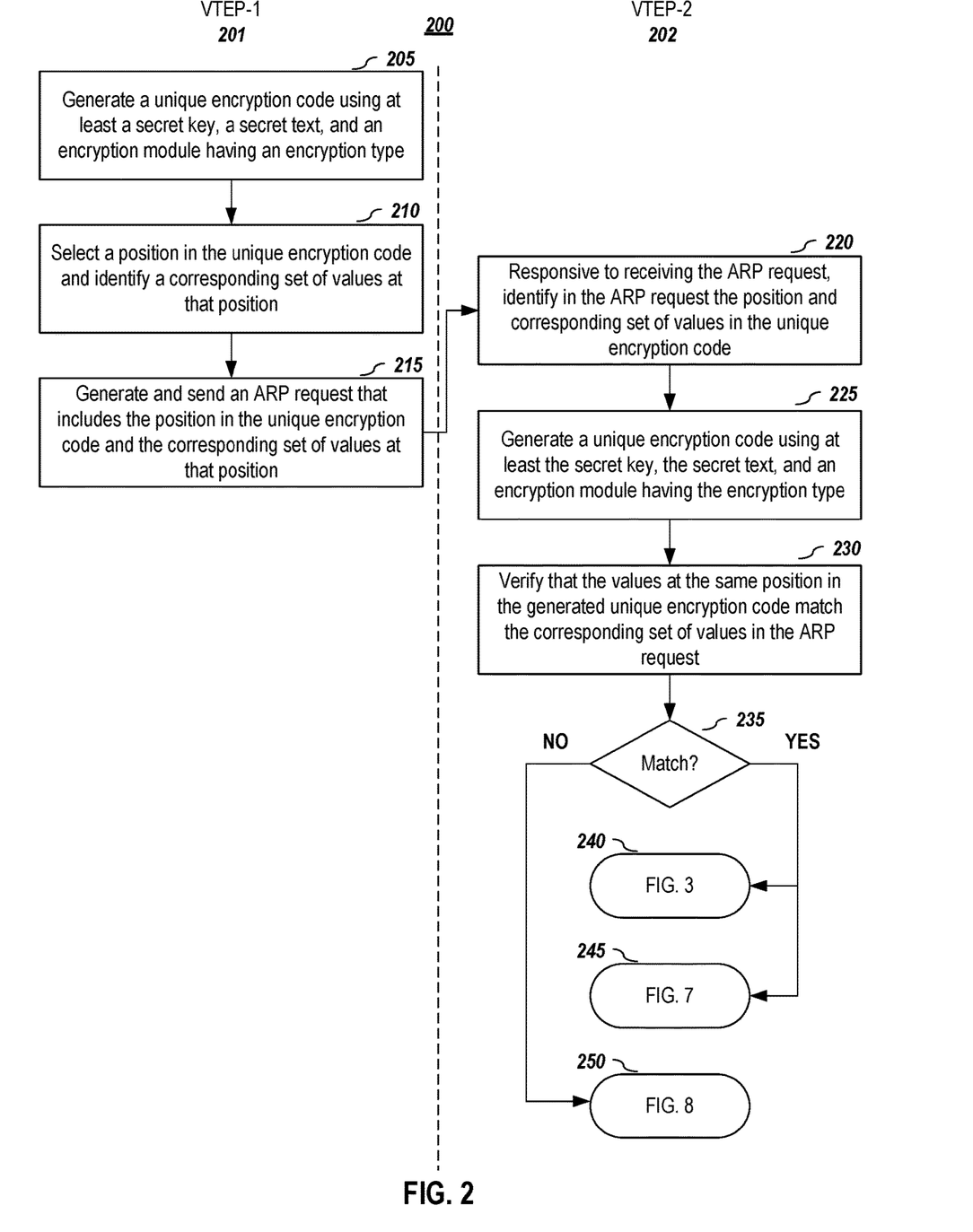
FIGS. 2 & 3 depict methodologies for providing security in VXLAN environments, according to embodiments of the present disclosure.
Figure 4:
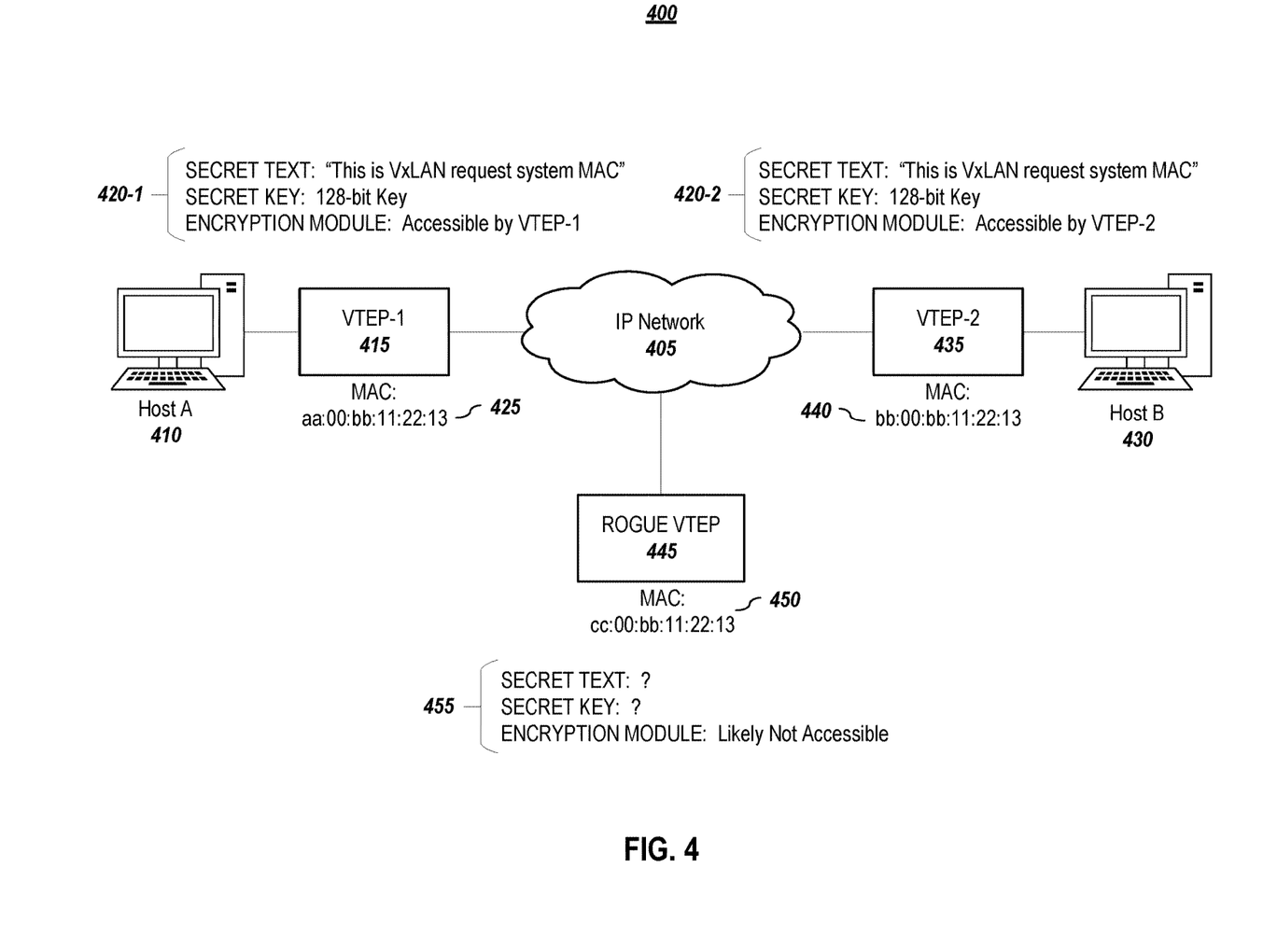
FIG. 4 depicts, for illustration purposes only, an example use case of increased security in a VXLAN environment, according to embodiments of the present disclosure.

FIG. 2 depicts methodologies for providing security in VXLAN environments, according to embodiments of the present disclosure. To help facilitate the explanation of the methodologies, FIG. 4 depicts, for illustration purposes only, an example use case of increased security in a VXLAN environment, according to embodiments of the present disclosure.

Figure 5A:
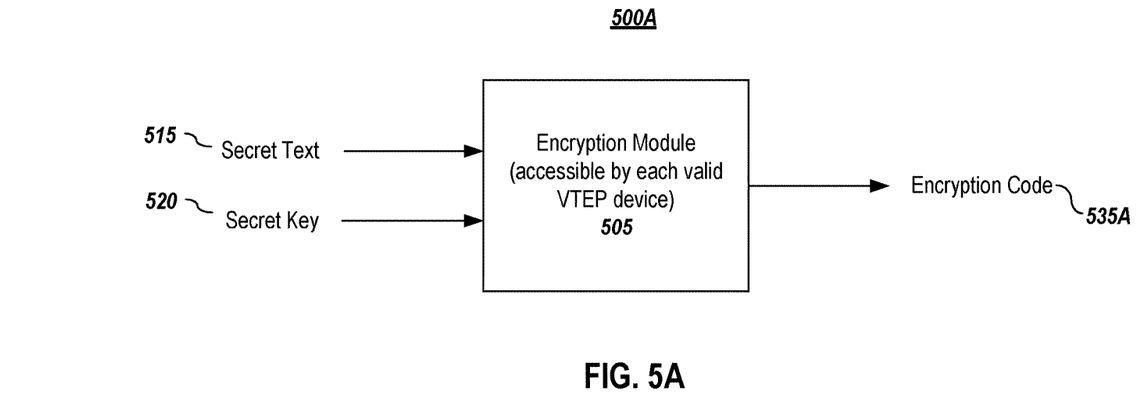
FIGS. 5A & 5B depict example methods for generating encryption code, according to embodiments of the present disclosure.
Figure 5B:
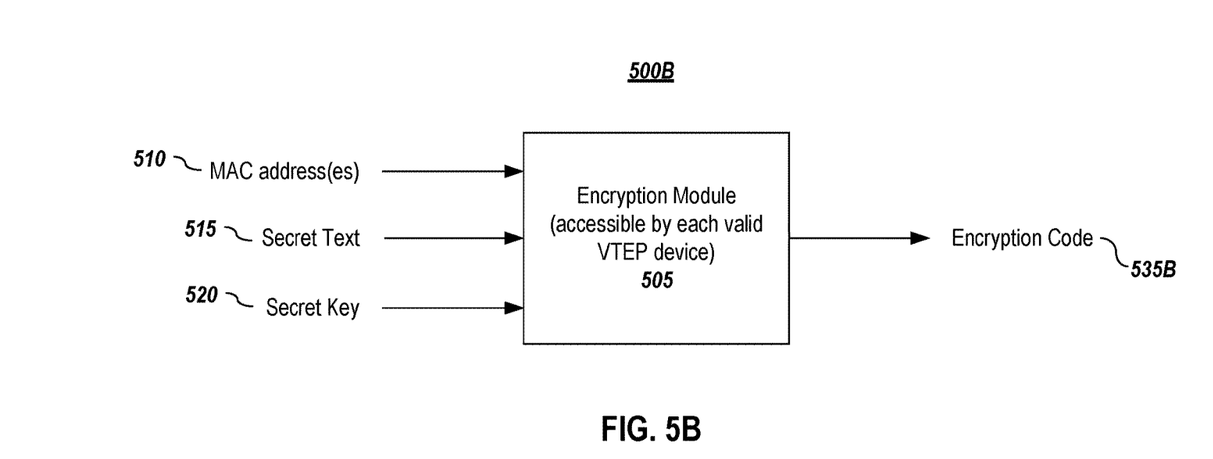

As illustrated, a VTEP device 201 (e.g., VTEP-1 415 in FIG. 4) generates (205) a unique encryption code. It shall be noted that a secure way of generating a unique encryption code may be done in any of a number of ways. In one or more embodiments, generating a unique encryption code may be performed using a combination of a secret key, a secret text, and an encryption module having an encryption type—all of which may be supplied to the VTEP-1 device (e.g., 420-1) as part of its configuring. FIGS. 5A & 5B depict example methods for generating encryption codes, according to embodiments of the present disclosure.

In the embodiments depicted in FIG. 5A, an encryption module 505 having a known encryption type (e.g., AES encryption with 128-bit key) is accessible to the VTEP device. The encryption module may be installed directly on the VTEP device or may be accessed by the VTEP via one or more other devices. In either embodiment, a secret text 515 and a secret key 520 are input into the encryption module 505 to generate a unique encryption code 535A or 535B. In an alternative embodiment 500B, additional data 510, such as a MAC address of the VTEP (e.g., MAC address 415 of VTEP-1 415) or MAC addresses, along with a secret text 515 and a secret key 520 are input into the encryption module 505 to generate a unique encryption code 535B. By way of illustration and not limitation, the secret text may be "This is the VxLAN request system MAC". In the embodiment 500B in which additional data 510 is used, the additional data may be combined with the secret text; and, in the example provided in FIG. 4, assuming that the additional data 510 is the request system's MAC address 425, the combined input of the secret text plus the additional data would be: "aa:00:bb:11:22:13 This is the VxLAN request system MAC".

Returning to FIG. 2, assume for sake of illustration that VTEP-1 generated the following unique encryption code:
FB4A3C5885F0615F406E97528022C439F35E0DAC9-3C756212E
AA8AC04332AFE40BEBA367D35D170DC9AB7834-98A380A6

VTEP-1 may select (210) a position in the unique encryption code and then identify a corresponding set of values at that position in the unique encryption code. In one or more embodiments, the position may be selected at random. Assuming, for illustration purposes, that position 3 was selected and that each "position" in the unique encryption code contained four characters; then, the corresponding set of values would be "85F0" because "FB4A" correspond to the characters at the first position and "3C58" correspond to the characters at the second position in the unique encryption code. It shall be noted that different ways of selecting the position and different numbers of characters per position may be used. In one or more embodiments, a plurality of positions and corresponding sets of values may be used. For simplicity of illustration, the examples herein use one position and one corresponding set of values.

Figure 6:
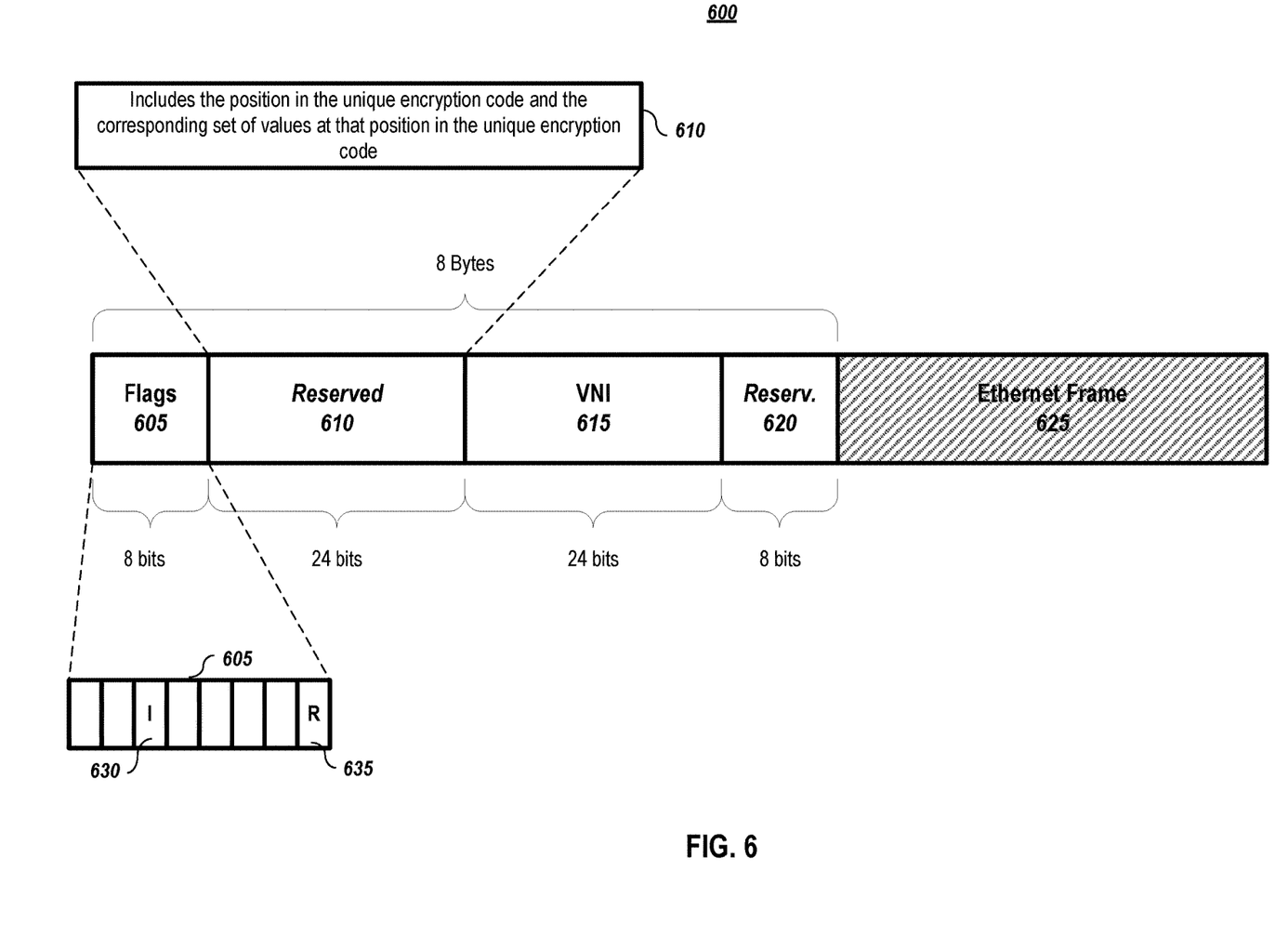
FIG. 6 depicts an example packet for facilitating increased security in a VXLAN environment, according to embodiments of the present disclosure.

Having identified the corresponding set of values in the unique encryption code, the VTEP device may generate (215) and send a mulitcast ARP request message that includes the position in the unique encryption code and the corresponding set of values at that position. In one or more embodiments, this information may be included in the VXLAN header. FIG. 6 depicts an example packet for facilitating increased security in a VXLAN environment, according to embodiments of the present disclosure.

As illustrated in FIG. 6, a typical VXLAN packet 600 comprises several bits that may be grouped into different sections, including a header comprising 8 bytes and a section for the payload of the Ethernet frame 625. The header may be divided into groups as follows:

Reserved (8 bits) 620, which is currently unused information. This may be set to zero on transmission and ignored when received;

VNI (24 bits) 615, which is used to hold the VNI ID number;

Reserved (24 bits) 610, in one or more embodiments, the first bits of the 24 reserved bits may be used to carry 8 bits set of values in the encrypted code and the position information; and Flags (8 bits) 605: Currently only bit 3 is used—this is the I flag 630, which indicates if this is a valid VNI. In one or more embodiments, the last bit—the R bit—may be set to 1 to indicate an embodiment of security disclosed herein is enabled.

It shall be noted that FIG. 6 depicts an example embodiment and that the configuration and placement of information in the packet may be different.

Returning to FIG. 2, responsive to receiving the ARP request, a receiving VTEP device 202 (e.g., VTEP-2 435) in the network identifies (220) in the ARP request the position and corresponding set of values in the unique encryption code. In like manner as the sending VTEP, the receiving VTEP generates (225) a unique encryption code. Because the receiving VTEP (e.g., VTEP-2 435) has been configured with the same secret key, the same secret text, and an encryption module with the same encryption type 420-2, the unique encryption code will be the same as the sending VTEP (e.g., VTEP-1 415). Note that, in embodiments in which additional information, such as MAC address, is also used in generating the unique encryption code, the receiving VTEP may be configured to know that it must include that information and will receive the sender's MAC address as part of the ARP request.

Having generated a unique encryption code, the receiving VTEP device verifies (230) that the values at the same position in the generated unique encryption code match the corresponding set of values that were included in the ARP request. Depending upon whether the values match, the receiving VTEP may take various actions, which will be discussed in more detail below.

By way of comparison, consider a rogue VTEP device (e.g., Rogue VTEP 445) that is connected to the network 405 with VTEP-1 and VTEP-2. Because the rogue VTEP device has not been configured with the secret key, the secret text, or the encryption module with the same encryption type, it cannot generate a matching unique encryption code like VTEP-2 did. And, in embodiments, in which additional data is included in the unique encryption code generation process, the device will not be programmed with any rules related to that to know what information to include for which messages. For example, it will not know what the additional data is or how it should be used in the unique encryption code generation. For example, the rogue VTEP device will not know the rule that if the message is a multicast ARP request, then the MAC address of the sending VTEP device should be added to the beginning of the secret text. These measures help provide several layers of security that previously did not exist in a typical VXLAN environment.

Returning to FIG. 2, if the values at the same position in the unique encryption code generated by the receiving VTEP match the corresponding set of values that were included in the ARP request, the receiving VTEP may take one or more affirmative actions.

Figure 7:
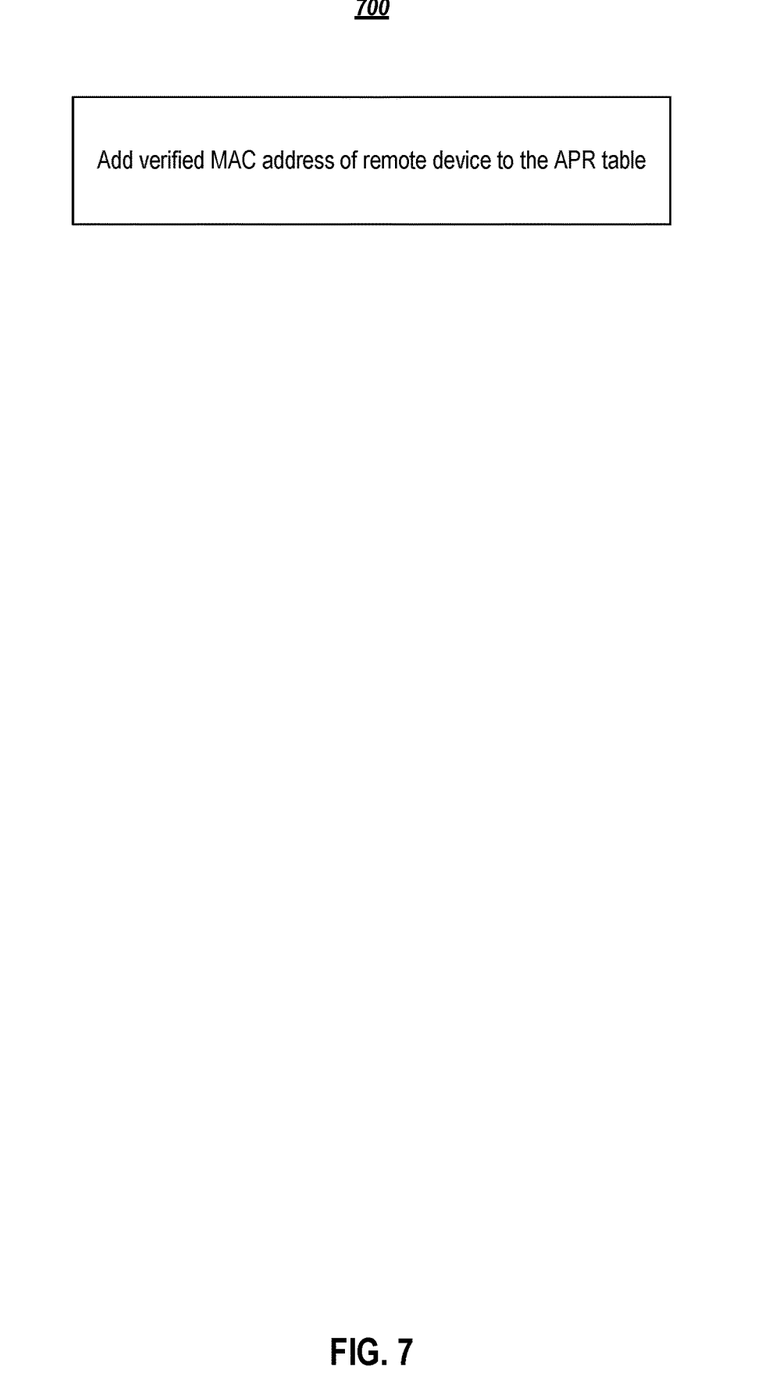
FIG. 7 depicts a method for updating verified address information, according to embodiments of the present disclosure.

In one or more embodiments, as illustrated in FIG. 7, if the received encryption code and generated encryption code match, the receiving VTEP (e.g., VTEP-2 435) can trust the sending VTEP and adds (700) its MAC into its ARP/MAC table.

Figure 3:
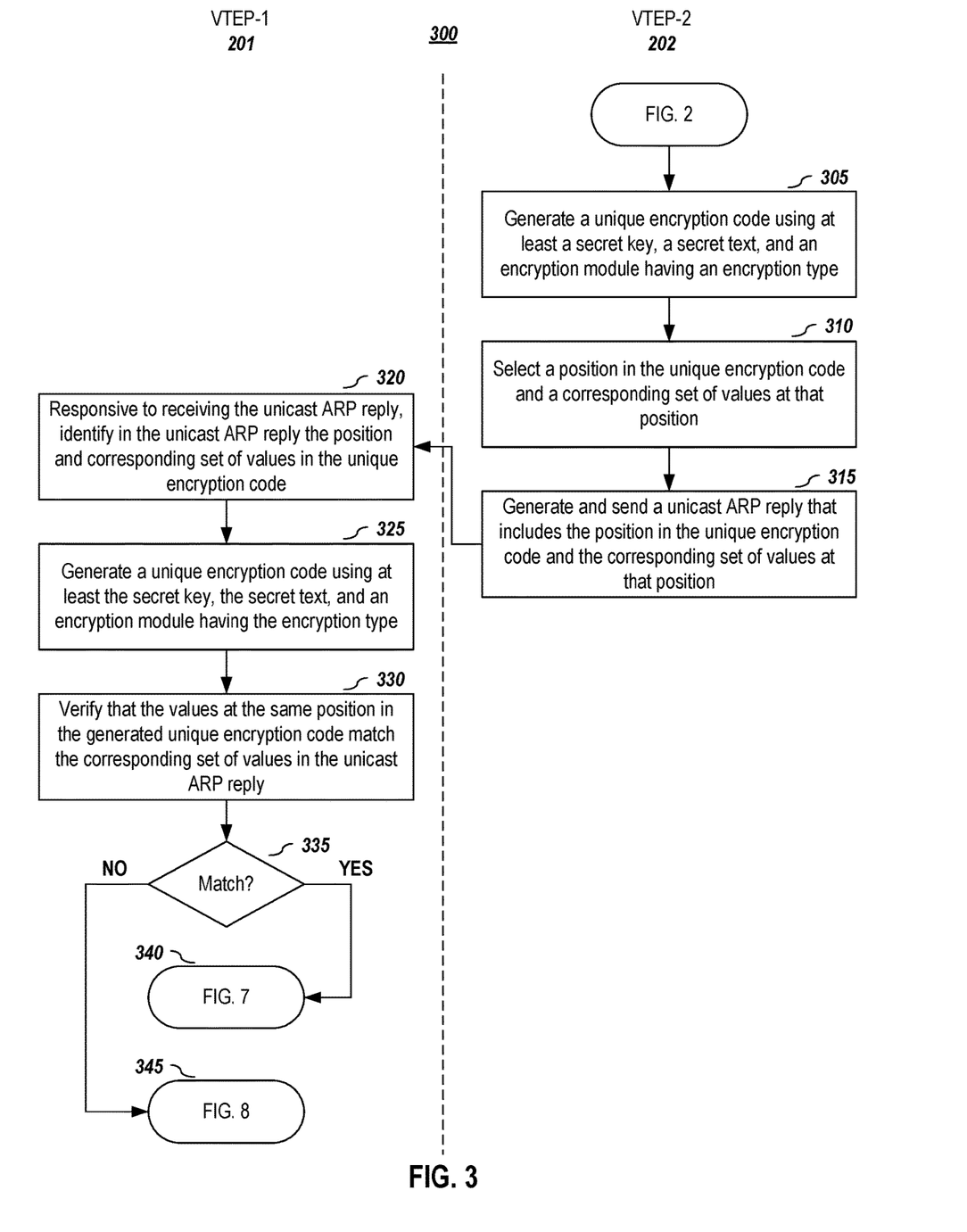

In one or more embodiments, the receiving VTEP, upon verifying that the sending VTEP is a trusted device may prepare a response to the ARP request. FIG. 3 depicts a methodology for providing a secure response in VXLAN environments, according to embodiments of the present disclosure. As illustrated, the VTEP information handling system (e.g., VTEP-2) responding to the ARP request may generate (305) a unique encryption code using at least a secret key, a secret text, and an encryption module having an encryption type. In one or more embodiments, in generating the unique encryption code, the secret text may be combined with additional data, such as the MAC address of the ARP request sender (e.g., VTEP-1), the MAC address of the responding VTEP device (e.g., VTEP-2), or both. For example, the combined text used as part of the input for generating the encryption code may be "bb:00:bb:11:22:13 aa:00:bb:11:22:13 This is the VXLAN request system MAC"—in which the MAC address of the responding VTEP device is added with the MAC address APR request sender's MAC address and the secret text. As noted above, what additional data, if any, that is combined with the secret text may be set by rules that have been configured in the devices. While the same encryption code that was previously generated could be used, one benefit of using a different input for generating the encryption code is that a different unique encryption code will be generated for the response, which helps improve security. Having generated a unique encryption, the responding VTEP selects (310) a position in this new unique encryption code and identifies the corresponding set of values at that position. As before, the selection of position may be done at random. Assume for sake of illustration that VTEP-2 generated the following unique encryption code:

0AD1798CF29D5E8835595A6A14C4685323FF2B5B-AAB5BC61
AE9E2E877C427E7BFB
527F6EEE8915AC01F18B477BB4E975E
FF5CA4D5D385420C2ECEEAA77C6FF5B

If the selected position is position 1, then the corresponding set of values at that position would be "0AD1". In one or more embodiments, the responding VTEP device then generated and sends (315) a unicast ARP reply that includes the position in the unique encryption code (e.g., position 1) and the corresponding set of values at that position (e.g., 0AD1).

The initiating VTEP (e.g., VTEP-1) receives (320) the APR response/reply message and identifies in the ARP reply the position and corresponding set of values in the unique encryption code. That VTEP generates (325) the corresponding unique encryption code in the same manner as the VTEP device that send the ARP reply (e.g., using the same secret key, the same additional data (if any), the same secret text, and an encryption module having the same encryption type). In one or more embodiments, the VTEP device verifies that the responding VTEP is a trusted device (and not a rogue device) by verifying (330) that the values at the designated position in the generated unique encryption code match the corresponding set of values in the unicast ARP reply.

If the values at the designated position in the generated unique encryption code match (340) the corresponding set of values in the unicast ARP reply, as illustrated in FIG. 7, the VTEP (e.g., VTEP-1) can trust the responding VTEP and adds (700) its MAC into its ARP/MAC table.

Figure 8:
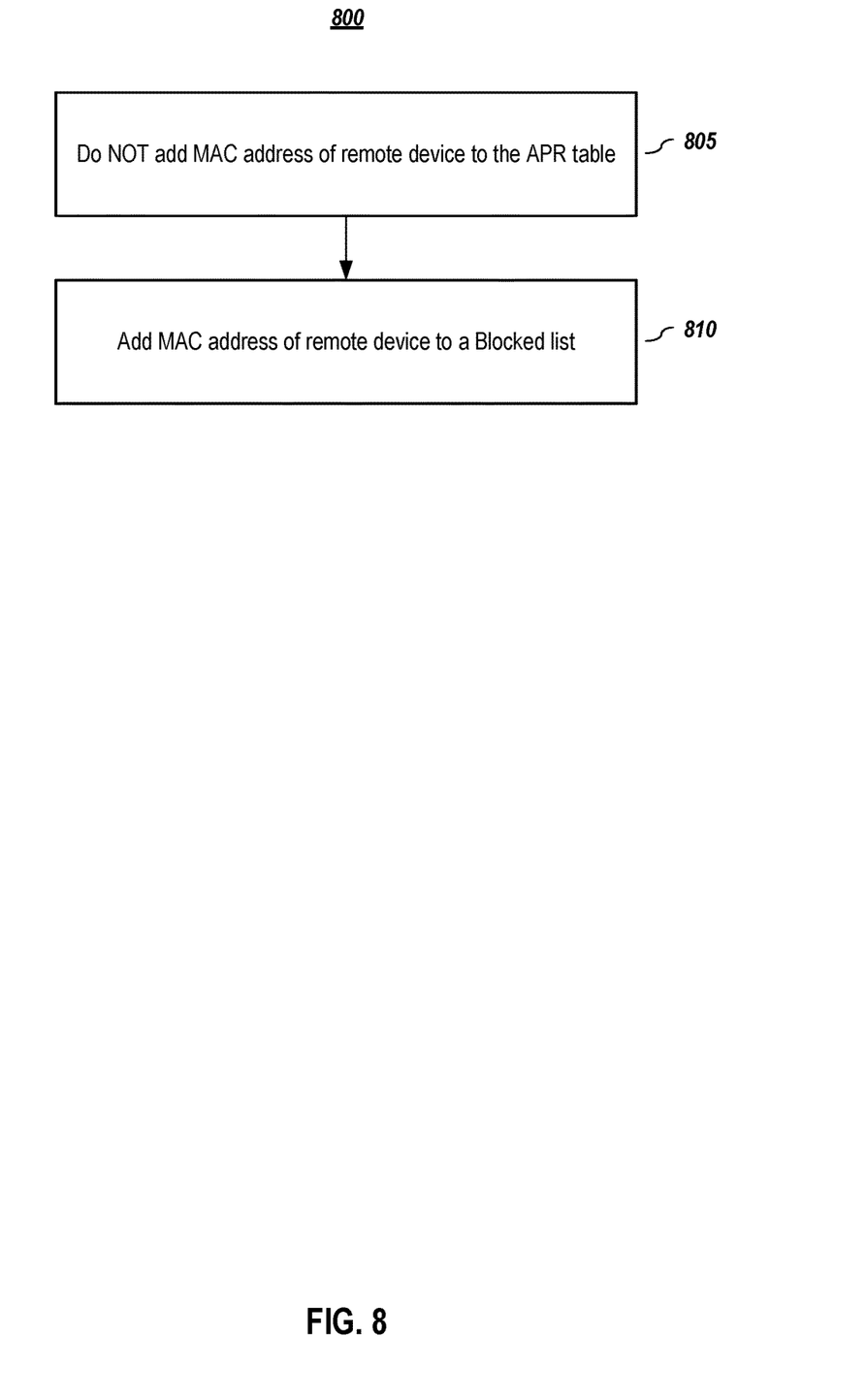
FIG. 8 depicts a method for handling unverified address information, according to embodiments of the present disclosure.

For FIG. 2 or FIG. 3, if the values at the designated position in the generated unique encryption code do not match (250/340) the set of values included in the received packet from the other VTEP device, as illustrated in FIG. 8, that VTEP device cannot trust the other VTEP device.

FIG. 8 depicts a method for handling unverified address information, according to embodiments of the present disclosure. In one or more embodiments, the VTEP does not add (805) the remote VTEP's MAC address to its ARP/MAC table. In one or more embodiments, the VTEP may also add (805) the other VTEP's MAC address to a "blocked" or "rogue" list, and the traffic is not forwarded and any next reply from that MAC address is not accepted.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 9:
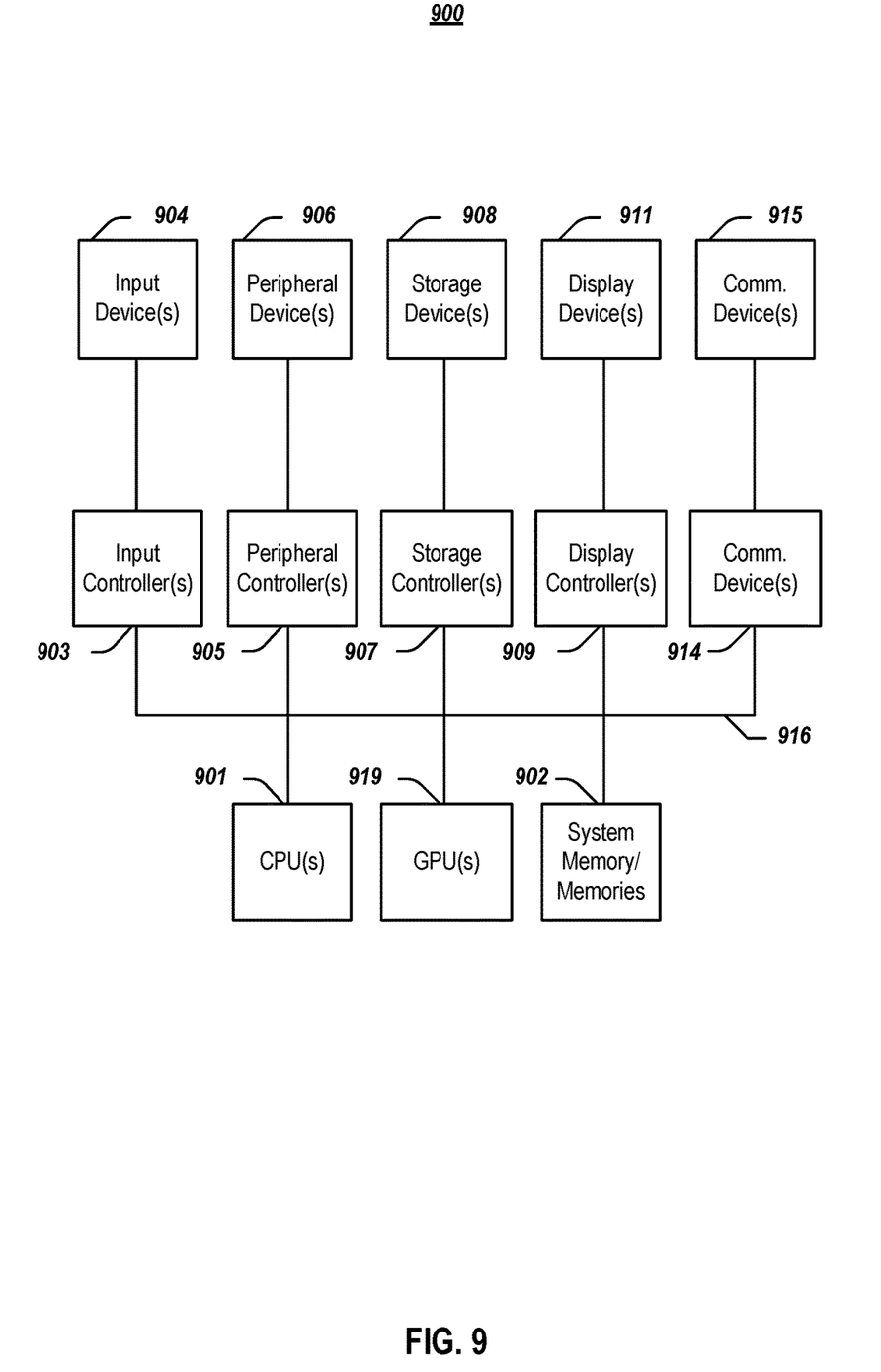
FIG. 9 depicts a simplified block diagram of an information handling system according to embodiments of the present invention.

FIG. 9 depicts a simplified block diagram of an information handling system (or computing system) according to embodiments of the present disclosure. It will be understood that the functionalities shown for system 900 may operate to support various embodiments of a computing system—although it shall be understood that a computing system may be differently configured and include different components, including having fewer or more components as depicted in FIG. 9.

As illustrated in FIG. 9, the computing system 900 includes one or more central processing units (CPU) 901 that provides computing resources and controls the computer. CPU 901 may be implemented with a microprocessor or the like, and may also include one or more graphics processing units (GPU) 919 and/or a floating-point coprocessor for mathematical computations. System 900 may also include a system memory 902, which may be in the form of random-access memory (RAM), read-only memory (ROM), or both.

A number of controllers and peripheral devices may also be provided, as shown in FIG. 9. An input controller 903 represents an interface to various input device(s) 904, such as a keyboard, mouse, touchscreen, and/or stylus. The computing system 900 may also include a storage controller 907 for interfacing with one or more storage devices 908 each of which includes a storage medium such as magnetic tape or disk, or an optical medium that might be used to record programs of instructions for operating systems, utilities, and applications, which may include embodiments of programs that implement various aspects of the present disclosure. Storage device(s) 908 may also be used to store processed data or data to be processed in accordance with the disclosure. The system 900 may also include a display controller 909 for providing an interface to a display device 911, which may be a cathode ray tube (CRT), a thin film transistor (TFT) display, organic light-emitting diode, electroluminescent panel, plasma panel, or other type of display. The computing system 900 may also include one or more peripheral controllers or interfaces 905 for one or more peripherals 906. Examples of peripherals may include one or more printers, scanners, input devices, output devices, sensors, and the like. A communications controller 914 may interface with one or more communication devices 915, which enables the system 900 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Figure 10:
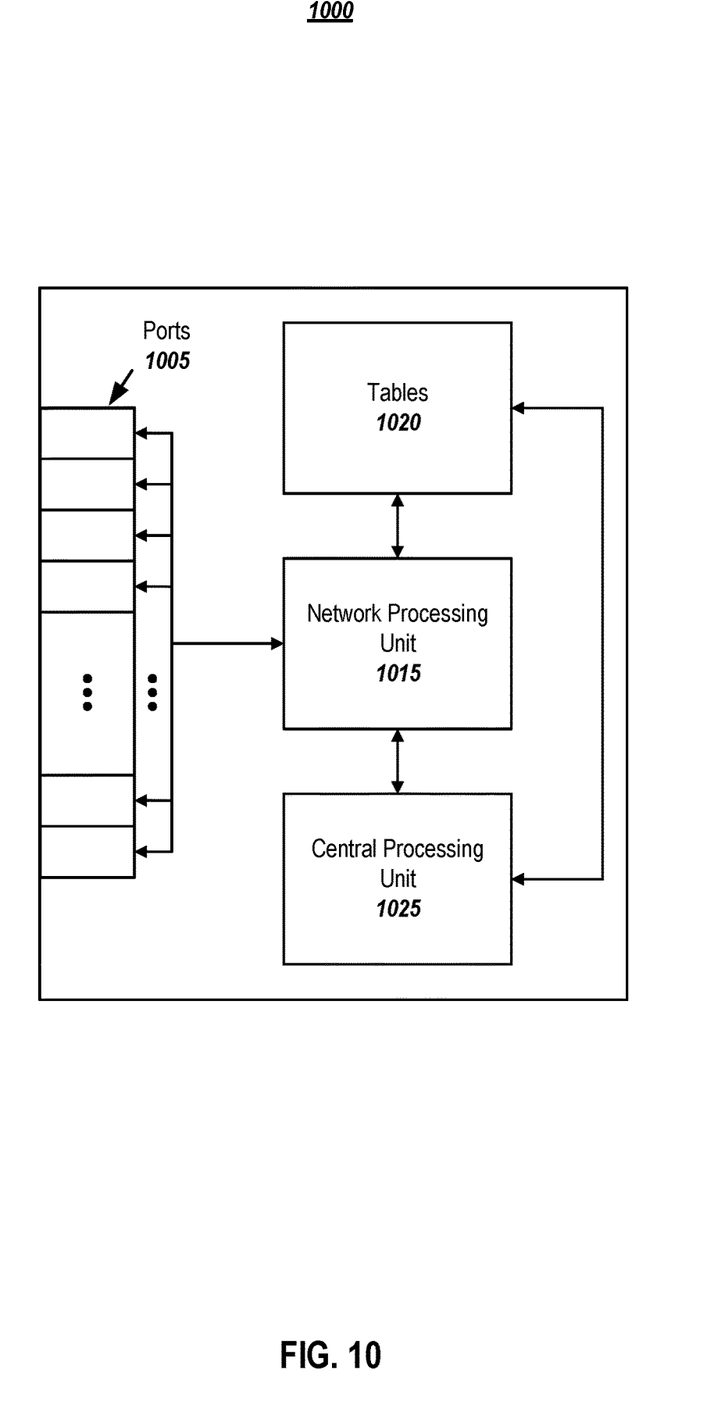
FIG. 10 depicts an alternative block diagram of an information handling system, according to embodiments of the present disclosure.

FIG. 10 depicts an alternative block diagram of an information handling system, according to embodiments of the present disclosure. It will be understood that the functionalities shown for system 1000 may operate to support various embodiments of the present disclosure—although it shall be understood that such system may be differently configured and include different components (including fewer or more components).

The information handling system 1000 may include a plurality of I/O ports 1005, a network processing unit (NPU) 1015, one or more tables 1020, and a central processing unit (CPU) 1025. The system includes a power supply (not shown) and may also include other components, which are not shown for sake of simplicity.

In one or more embodiments, the I/O ports 1005 may be connected via one or more cables to one or more other network devices or clients. The network processing unit 1015 may use information included in the network data received at the node 1000, as well as information stored in the tables 1020, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method comprising:
    generating a unique encryption code using an encryption module having an encryption type and at least one of a secret key and a secret text;
    selecting a position in the unique encryption code;
    identifying a corresponding set of values at that position in the unique encryption code; and
    generating a message that includes a value representing the position in the unique encryption code and the corresponding set of values at that position in the unique encryption code for use for a receiver to verify a sender of the message.

2. The computer-implemented method of claim 1 wherein the message is an Address Resolution Protocol message and the sender is a VTEP device.

3. The computer-implemented method of claim 1 wherein the step of generating a unique encryption code using an encryption module having an encryption type and at least one of a secret key and a secret text further comprises:
    combining additional data with the secret text as an input when generating the unique encryption code.

4. The computer-implemented method of claim 3 wherein the additional data comprises a Media Access Control of the sender of the message.

5. The computer-implemented method of claim 1 further comprising the steps of:
    responsive to receiving a reply message, identifying in the reply message a second value indicating a second position and a corresponding set of values in a second unique encryption code;
    generating the second unique encryption code using at least the secret key, the secret text, and the encryption module having the encryption type; and
    determining whether the values at the second position in the second unique encryption code match the corresponding set of values in the reply message.

6. The computer-implemented method of claim 5 further comprising the steps of:
    responsive to determining that the values at the second position in the second unique encryption code match the corresponding set of values in the reply message, adding a MAC address of a remote device that generated the reply message to a networking table as a verified device.

7. The computer-implemented method of claim 5 further comprising the steps of:
responsive to determining that the values at the second position in the second unique encryption code do not match the corresponding set of values in the reply message:
not adding a MAC address of a remote device that generated the reply message to a networking table as a verified device;
adding the MAC address of the remote device to a blocked list or an untrusted device list; or
both.

8. A computer-implemented method comprising:
receiving at a receiving device a message sent from a sending device; and
responsive to the receiving device identifying an indicator in a message that indicates enhanced verification, performing steps comprising:
identifying in the message a value indicting a position in a unique encryption code and a corresponding set of values that should exist at that position in the unique encryption code;
generating the unique encryption code using an encryption module having an encryption type and at least one of a secret key and a secret text, wherein the sending device and the receiving device each has access to an encryption module having the encryption type and each knows the at least one of the secret key and the secret text; and
responsive to determining that the values at the same position in the unique encryption code match the corresponding set of values in the message, adding a MAC address of the sending device that generated the message to a networking table as a verified device for which data traffic may be sent to, received from, or both.

9. The computer-implemented method of claim 8 wherein the message is an Address Resolution Protocol message and the sending device and the receiving device are VTEP devices.

10. The computer-implemented method of claim 8 wherein the indicator is a bit in a header of the message and the value indicating the position and the corresponding set of values is also in a header of the message.

11. The computer-implemented method of claim 9 wherein the step of generating the unique encryption code using an encryption module having an encryption type and at least one of a secret key and a secret text, comprises:
combining additional data with the secret text as an input when generating the unique encryption code, in which the additional data that is combined with the secret text is known according to a rule known to the sending device and the receiving device.

12. The computer-implemented method of claim 8 further comprising the steps of:
responsive to determining that the values at the same position in the unique encryption code do not match the corresponding set of values in the message:
not adding a MAC address of the sending device to a networking table as a verified device;
adding the MAC address of the sending device to a blocked list or an untrusted device list; or
both.

13. The computer-implemented method of claim 8 further comprising the steps of responsive to determining that the values at the same position in the unique encryption code match the corresponding set of values in the message, further comprises:
generating a second unique encryption code using at least the secret key, the secret text, and the encryption module having an encryption type;
selecting a position in the second unique encryption code;
identifying a corresponding set of values at that position in the second unique encryption code;
generating a reply message that includes the position in the second unique encryption code and the corresponding set of values at that position; and
sending the reply message to the sending device.

14. The computer-implemented method of claim 13 wherein the step of generating a second unique encryption code using at least the secret key, the secret text, and the encryption module having an encryption type comprises:
combining additional data with the secret text as an input when generating the second unique encryption code.

15. The computer-implemented method of claim 8 wherein the position is a byte position and the value represents that byte position in the unique encryption code and the corresponding set of values are the values at that byte position in the unique encryption code.

16. An information handling system comprising:
one or more processors; and
a non-transitory computer-readable medium or media comprising one or more sets of instructions which, when executed by at least one of the one or more processors, causes steps to be performed comprising:
generating a unique encryption code using an encryption module having an encryption type and at least one of a secret key and a secret text;
selecting a position in the unique encryption code;
identifying a corresponding set of values at that position in the unique encryption code; and
generating a message that includes a value representing the position in the unique encryption code and the corresponding set of values at that position in the unique encryption code for use for a receiver of the packet to verify a sender of the message.

17. The information handling system of claim 16 wherein the step of generating a unique encryption code using an encryption module having an encryption type and at least one of a secret key and a secret text further comprises:
combining additional data with the secret text as an input when generating the unique encryption code.

18. The information handling system of claim 17 wherein the additional data comprises a Media Access Control of the sender of the message.

19. The information handling system of claim 16 wherein the non-transitory computer-readable medium or media further comprises one or more sets of instructions which, when executed by at least one of the one or more processors, causes steps to be performed comprising:
responsive to receiving a reply message, identifying in the reply message a second value indicating a second position and a corresponding set of values in a second unique encryption code;
generating the second unique encryption code using at least the secret key, the secret text, and the encryption module having the encryption type; and
determining whether the values at the second position in the second unique encryption code match the corresponding set of values in the reply message.

20. The information handling system of claim 19 wherein the non-transitory computer-readable medium or media further comprises one or more sets of instructions which, when executed by at least one of the one or more processors, causes steps to be performed comprising:
   responsive to determining that the values at the second position in the second unique encryption code match the corresponding set of values in the reply message, adding a MAC address of a remote device that generated the reply message to a networking table as a verified device.

21. The information handling system of claim 19 wherein the non-transitory computer-readable medium or media further comprises one or more sets of instructions which, when executed by at least one of the one or more processors, causes steps to be performed comprising:
   responsive to determining that the values at the second position in the second unique encryption code do not match the corresponding set of values in the reply message:
      not adding a MAC address of a remote device that generated the reply message to a networking table as a verified device;
      adding the MAC address of the remote device to a blocked list or an untrusted device list; or
      both.

* * * * *